(12) United States Patent
Nakama

(10) Patent No.: US 12,320,789 B2
(45) Date of Patent: Jun. 3, 2025

(54) THERMAL CONDUCTIVITY DETECTOR

(71) Applicant: Shimadzu Corporation, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 312 days.

(21) Appl. No.: 18/024,600

(22) PCT Filed: Oct. 28, 2020

(86) PCT No.: PCT/JP2020/040391
§ 371 (c)(1),
(2) Date: Mar. 3, 2023

(87) PCT Pub. No.: WO2022/091244
PCT Pub. Date: May 5, 2022

(65) Prior Publication Data
US 2023/0324348 A1 Oct. 12, 2023

(51) Int. Cl.
*G01N 30/66* (2006.01)
*G01N 27/18* (2006.01)
(Continued)

(52) U.S. Cl.
CPC ......... *G01N 30/66* (2013.01); *G01N 30/606* (2013.01); *G01N 27/18* (2013.01); *G01N 2030/025* (2013.01)

(58) Field of Classification Search
CPC ............... G01N 30/066; G01N 30/606; G01N 2030/025; G01N 27/18
See application file for complete search history.

(56) References Cited

U.S. PATENT DOCUMENTS

| 7,185,527 B2 | 3/2007 | Lin |
| 2011/0100093 A1 | 5/2011 | Kawana |

(Continued)

FOREIGN PATENT DOCUMENTS

| CN | 105765378 A | 7/2016 |
| CN | 107807197 A | 3/2018 |

(Continued)

OTHER PUBLICATIONS

Written Opinion for PCT application No. PCT/JP2020/040391 dated May 5, 2022.

(Continued)

*Primary Examiner* — Peter J Macchiarolo
*Assistant Examiner* — John M Royston
(74) *Attorney, Agent, or Firm* — Muir Patent Law, PLLC

(57) ABSTRACT

A thermal conductivity detector includes: a first flow path (4) in which a filament (2) is arranged; a second flow path (6) provided separately from the first flow path (4); an introduction flow path (8) configured to fluidly communicate between an upstream of the first flow path (4) and an upstream end of the second flow path (6); a sample inlet (10) configured to introduce a sample gas to the introduction flow path (8); a first gas inlet (12) provided between the sample inlet (10) in the introduction flow path (8) and an upstream end of the first flow path (4); a second gas inlet (14) provided between the sample inlet (10) in the introduction flow path (8) and an upstream end of the second flow path (6); a carrier gas supply source (18); a selector (22) configured to selectively introduce the carrier gas from the carrier gas supply source (18) to one of the first gas inlet (12) and the second gas inlet (14); and a detection circuit (24) configured to detect a component in a sample gas via the filament (2), wherein when the carrier gas from the carrier gas supply source (18) is guided to the first gas inlet (12), a reference (Continued)

phase in which only the carrier gas flows through the first flow path (4) is formed, when the carrier gas from the carrier gas supply source (18) is guided to the second gas inlet (14), a sampling phase in which the sample gas flows through the first flow path (4) is formed, and wherein fluid resistance of the first flow path (4) and flow resistance of the second flow path (6) are designed such that a ratio of a difference between a reference flow rate and a sampling flow rate to each of the reference flow rate and the sampling flow rate becomes 15% or less, the reference flow rate being a flow rate of a gas flowing through the first flow path (4) in the reference phase, the sampling flow rate being a flow rate of gases flowing through the first flow path (4) in the sampling phase.

5 Claims, 3 Drawing Sheets

(51) Int. Cl.
    *G01N 30/02*     (2006.01)
    *G01N 30/60*     (2006.01)

(56) References Cited

U.S. PATENT DOCUMENTS

2016/0018365 A1     1/2016    Agah et al.
2016/0103105 A1*   4/2016    Nakama ................ G01N 30/62
                                                                           73/23.4

FOREIGN PATENT DOCUMENTS

CN           110895268 A      3/2020
GB             2033087 A      5/1980
JP             S59-79149 A      5/1984

OTHER PUBLICATIONS

European Search Report issued Jul. 3, 2024 by the from the European Patent Office for the European Patent Application No. 20959762.4.

Chinese First OA for corresponding application No. CN 202080105975.4 dated Mar. 21, 2025.

\* cited by examiner

Sampling phase

Reference phase

THERMAL CONDUCTIVITY DETECTOR

TECHNICAL FIELD

The present invention relates to a thermal conductivity detector for detecting components separated by a separation column in a gas chromatography analysis.

BACKGROUND ART

A thermal conductivity detector (TCD: Thermal Conductivity Detector) is known as a detector for a gas chromatography analysis. A thermal conductivity detector is provided with a filament arranged in a flow path through which a sample gas flows and is configured to bring the sample gas into contact with the heated filament to acquire a chromatogram based on the change in the resistance value of the filament corresponding to the thermal conductivity of the components in the sample gas. Further, in order to eliminate the drift of the baseline of the chromatogram over time, in addition to the signal (sampling signal) when the sample gas is in contact with the filament, a signal (reference signal) when the reference gas not including the sample is in contact with the filament is acquired.

As a thermal conductivity detector has, in addition to a double filament type thermal conductivity detector configured to acquire a sampling signal and a reference signal by using two filaments, there is a single filament type thermal conductivity detector configured to acquire a sampling signal and a reference signal by using a single filament (see Patent Document 1). In a double filament type thermal conductivity detector, the individual difference between the filament for acquiring the sampling signal and the filament for acquiring the reference signal affects the detection accuracy.

On the other hand, in the single filament type thermal conductivity detector, a sampling phase in which a sample gas flows through a flow path in which the filament is arranged and a reference phase in which a reference gas flows through a flow path in which a filament is arranged are formed alternately to thereby acquire a sampling signal and the reference signal with a single filament. For this reason, there is no effect on the detection accuracy due to the individual difference of the filaments.

PRIOR ART DOCUMENT

Patent Document

Patent Document 1: U.S. Pat. No. 7,185,527

SUMMARY OF THE INVENTION

Problems to be Solved by the Invention

In a single filament type thermal conductivity detector, a flow path in which a filament is arranged and a flow path in which no filament is arranged are provided. The gas introduction position of a carrier gas supplied from a carrier gas supply source is switched to change a flow direction of a sample gas, thereby forming a sampling phase and a reference phase. As described above, since the gas flow in the detector is different between the sampling phase and the reference phase, noises are generated when the phases are switched, which deteriorates the S/N (Signal/Noise) ratio.

The present invention has been made in view of the above-described problems, and the object of the present invention is to improve an S/N ratio of a single filament type thermal conductivity detector.

Means for Solving the Problems

In a conventional single filament type thermal conductivity detector, it is common that a fluid resistance of a flow path (hereinafter referred to as "first flow path") in which a filament is arranged is designed to be extremely large as compared with a flow path (hereinafter referred to as "second flow path") in which no filament is arranged. On the other hand, the present inventor found the fact that when a fluid resistance of the first flow path is extremely increased as compared with that of the second flow path, the gas flow rate in the first flow path fluctuates greatly when the phases are switched between the sampling phase and the reference phase, thereby generating noises. The present inventor has found the fact that it is possible to suppress the fluctuation of the gas flow in the first flow path at the time of changing the phase by adjusting the relation between the flow resistance of the first flow path and the flow resistance of the second flow path, and that it is also possible to fall the S/N ratio within an allowable range by suppressing the fluctuation range to fall within a range of 15% or less of the gas flow rate at each phase. The present invention has been made based on such findings.

A thermal conductivity detector according to the present invention includes:
a first flow path in which a filament is arranged;
a second flow path provided separately from the first flow path;
an introduction flow path configured to fluidly communicate between an upstream end of the first flow path and an upstream end of the second flow path;
a sample inlet configured to introduce a sample gas to the introduction flow path;
a first gas inlet provided between the sample inlet in the introduction flow path and the upstream end of the first flow path;
a second gas inlet provided between the sample inlet in the introduction flow path and the upstream end of the second flow path;
a carrier gas supply source;
a selector configured to selectively introduce the carrier gas from the carrier gas supply source to one of the first gas inlet and the second gas inlet; and
a detection circuit configured to detect a component in the sample gas using the filament.

When the carrier gas from the carrier gas supply source is guided to the first gas inlet, a reference phase in which only the carrier gas flows through the first flow path is formed, and when the carrier gas from the carrier gas supply source is guided to the second gas inlet, a sampling phase in which the sample gas flows through the first flow path is formed.

Fluid resistance of the first flow path and fluid resistance of the second flow path are designed such that a ratio of a difference between a reference flow rate and a sampling flow rate to each of the reference flow rate and the sampling flow rate becomes 15% or less, the reference flow rate being a flow rate of a gas flowing through the first flow path in the reference phase, the sampling flow rate being a flow rate of gases flowing through the first flow path in the sampling phase.

Effects of the Invention

According to the thermal conductivity detector of the present invention, in the reference phase, a fluid resistance of the first flow path and a flow resistance of the second flow path are designed such that a ratio of a difference between a reference flow rate and a sampling flow rate to each of the reference flow rate and the sampling flow rate becomes 15% or less, the reference flow rate being a flow rate of a gas flowing through the first flow path in the reference phase, the sampling flow rate being a flow rate of a gas flowing through the first flow path in the sampling phase. Therefore, noises due to the switching of phases are reduced, thereby improving the S/N ratio.

EMBODIMENTS FOR CARRYING OUT THE INVENTION

Hereinafter, one example of a thermal conductivity detector according to the present invention will be described with reference to the drawings.

Figure 1:
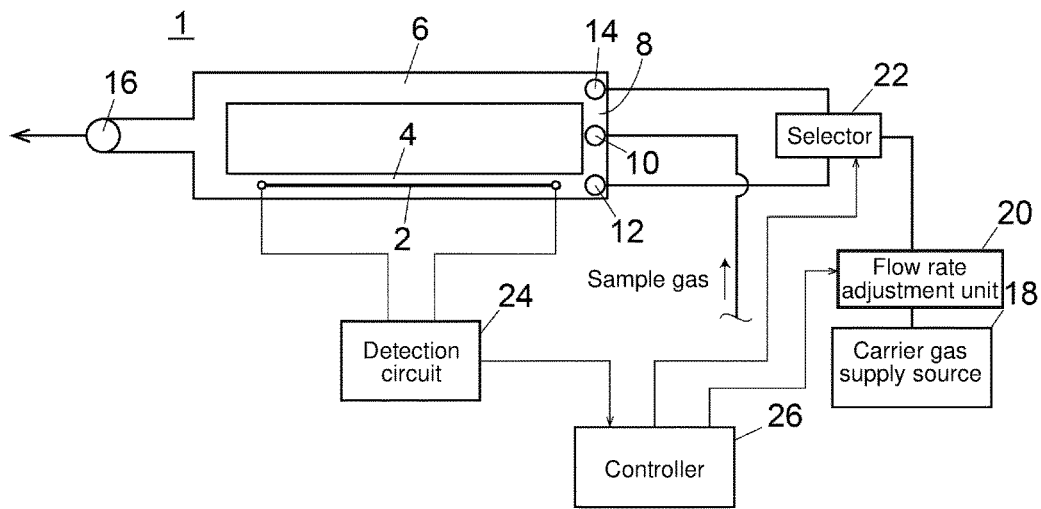
FIG. 1 is a schematic configuration diagram showing one example of a thermal conductivity detector.

As shown in FIG. 1, the thermal conductivity detector 1 is provided with a first flow path 4, a second flow path 6, an introduction flow path 8, a carrier gas supply source 18, a flow rate adjustment unit 20, a selector 22, a detection circuit 24, and a controller 26.

A filament 2 is arranged in the first flow path 4, and no filament is arranged in the second flow path. The introduction flow path 8 is a flow path that fluidly communicates the upstream end of the first flow path 4 with the upstream end of the second flow path 6. The introduction flow path 8 is provided with a sample inlet 10, a first gas inlet 12, and a second gas inlet 14. The first gas inlet 12 is provided between the upstream end of the first flow path 4 and the sample inlet 10. The second gas inlet 14 is provided between the upstream end of the second flow path 6 and the sample inlet 10.

In this example, the first flow path 4 and the second flow path 6 merge at the downstream thereof, and the gases flowing through the first flow path 4 and the second flow path 6 are discharged from the gas outlet 16. Note that the present invention is not limited thereto, and the first flow path 4 and the second flow path 6 may not merge at the downstream thereof.

The sample inlet 10 is fluidly connected to a downstream-side flow path of a separation column of a gas chromatograph, and a sample gas eluted from the separation column is introduced to the introduction flow path 8 via the sample inlet 10.

A carrier gas supply source 18 is fluidly connected to each of the first gas inlet 12 and the second gas inlet 14 via a selector 22. A carrier gas supplied from the carrier gas supply source 18 is introduced into the introduction flow path 8 via one of the first gas inlet 12 and the second gas inlet 14 selected by the selector 22. The selector 22 can be realized by, for example, a three-way solenoid valve. A flow rate adjustment unit 22 is provided between the carrier gas supply source 18 and the selector 22, and the flow rate of the carrier gas (hereinafter referred to as "carrier gas supply flow rate") supplied from the carrier gas supply source 18 is adjusted by the flow rate adjustment unit 22. For example, a mass flow controller may be used as the flow rate adjustment unit 22.

A detection circuit 24 is configured such that a filament 2 constitutes one resistor of a bridge-circuit to electrically detect the change in the resistance of the filament 2.

In this thermal conductivity detector 1, the flow of the sample gas and that of the carrier gas are switched by the selector 22 to form two phases, i.e., a sampling phase and a reference phase, and a detection signal in each phase is acquired by the detection circuit 24.

Figure 2:
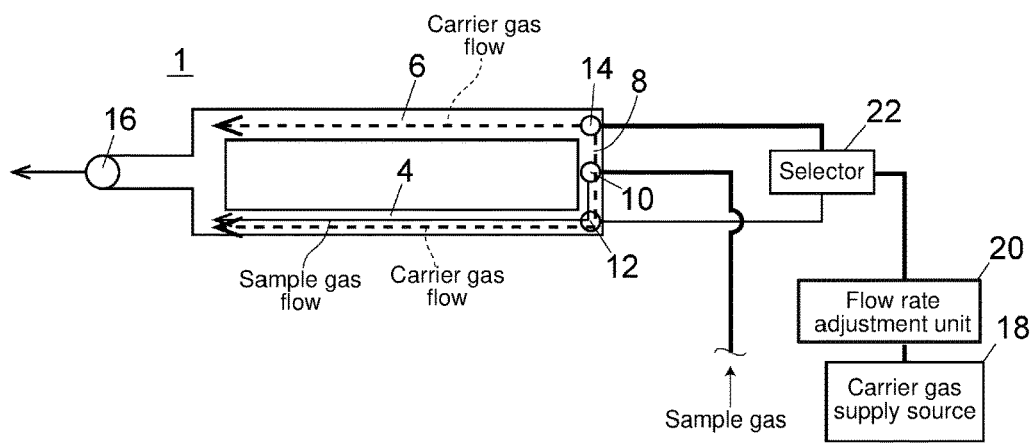
FIG. 2 is a conceptual diagram for describing a flow of gases in a sampling phase.

As shown in FIG. 2, in a case where the second gas inlet 14 is selected by the selector 22, the carrier gas supplied from the carrier gas supply source 18 is introduced to the introduction flow path 8 via the second gas inlet 14, and the pressure in the introduction flow path 8 on the side of the second flow path 6 becomes higher than that on the side of the first flow path 4. Thus, the sample gas introduced from the sample inlet 10 into the introduction flow path 8 flows through the first flow path 4 together with a part of the carrier gas introduced from the second gas inlet 14. That is, the sampling phase is formed in which the sample gas flows through the first flow path 4.

Figure 3:
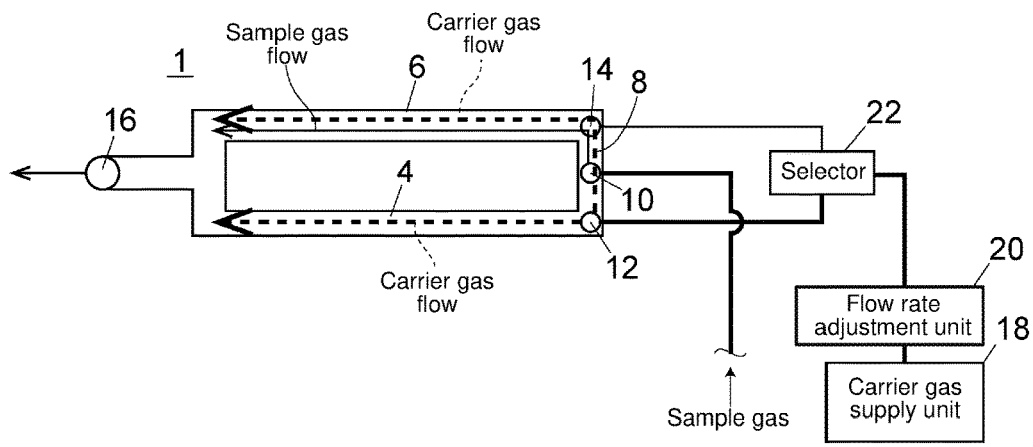
FIG. 3 is a conceptual diagram for describing a flow of gases in a reference phase.

On the other hand, as shown in FIG. 3, in a case where the first gas inlet 12 is selected by the selector 22, the carrier gas supplied by the carrier gas supply source 18 is introduced to the introduction flow path 8 via the first gas inlet 12, and the pressure in the introduction flow path 8 on the side of the first flow path 4 becomes higher than that on the side of the second flow path 6. Thus, the sample gas introduced from the sample inlet 10 to the introduction flow path 8 flows through the second flow path 6 together with a part of the carrier gas introduced from the first gas inlet 12, and only the carrier gas flows through the first flow path 4. That is, a reference phase is formed in which a reference gas not including the sample flows through the first flow path.

Returning to FIG. 1, the controller 26 controls the operation of the flow rate adjustment unit 20 and that of the selector 22. The controller 26 may be implemented by an electronic circuitry provided with a CPU or the like. The controller 26 continuously switches the selector 22 to alternately form a sampling phase and a reference phase.

As described above, the flow of the sample gas and that of the carrier gas differ between the sampling phase and the reference phase. Therefore, the flow rate of the gases flowing through the first flow path 4 in which the filament 2 is arranged fluctuates in accordance with the phase switching. In this example, the respective dimensions (cross-sectional area and/or length) are designed so that the relation between the flow resistance of the first flow path 4 and that of the second flow path 6 satisfies the predetermined relation, thereby suppressing the fluctuation of the gas flow rate of the first flow path 4 generated in accordance with the phase switching.

The fluid resistance of the first flow path 4 and that of the second flow path 6 are designed to satisfy that a ratio of an absolute value $\Delta L$ to each of a sampling flow rate $L1$ and a reference flow rate $L2$ in the first flow path 4 and the second flow path 6 satisfies 15% or less, wherein the sampling flow rate $L1$ is an average flow rate of gases (carrier gas+sample gas) flowing through the first flow path 4 in the sampling phase, and the reference flow rate L2 is an average flow rate of a gas flowing through the first flow path 4 in the reference phase, i.e., to satisfy the relation of $(\Delta L/L1) \leq 0.15$, and $(\Delta L/L2) \leq 0.15$.

More specifically, the fluid resistance R1 of the first flow path 4 and the fluid resistance R2 of the second flow path 6 are designed to satisfy the relation of:

$R1/R2 \leq 3$, and $R2/R1 \leq 3$.

The present inventor obtained findings through tests that when the first flow path 4 and the second flow path are designed as described above, the fluctuation of the flow rate of the gases flowing through the detector can be suppressed, as compared with a conventional thermal conductivity detector. That is, since the fluctuation of the flow rate of the gases flowing through the first flow path 4 is suppressed, when the flow rate of the carrier gas supplied from the carrier gas supply source 18 changes, the duration until the temperature of the filament 2 stabilizes is shortened. That is, even in a case where the flow rate of the carrier gas supplied by the carrier gas supply source 18 is changed, the filament 2 can be quickly stabilized, that is, the baseline of the detection signal can be quickly stabilized.

In this example, it is configured such that the controller 26 reduces the carrier gas consumption by reducing the supply flow rate of the carrier gas supplied during the stand-by time in which the sample is not analyzed, than that at the time of the analysis.

An exemplary control of the supply flow rate of the carrier gas supplied from the carrier gas supply source 18 will be described with reference to the flow chart of FIG. 4 and the time chart of FIG. 5 together with FIG. 1.

Figure 4:
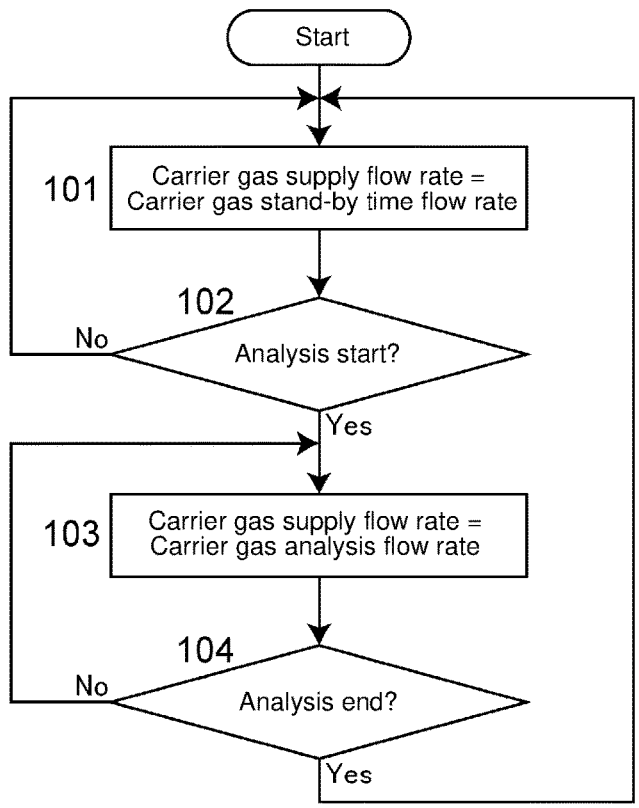
FIG. 4 is a flowchart showing a first example of a control operation of a carrier gas supply flow rate.
Figure 5:
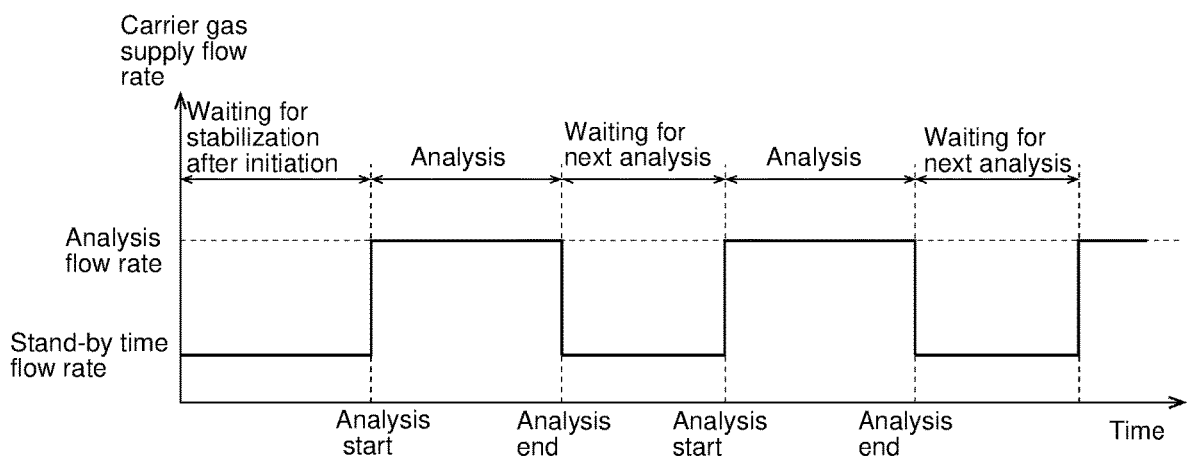
FIG. 5 is a time chart of a carrier gas supply flow rate implemented by a first example of a control operation.

When the analysis system including the thermal conductivity detector 1 is activated, the controller 26 controls the flow rate adjustment unit 20 so that the supply flow rate of the carrier gas supplied from the carrier gas supply source 18 becomes a preset stand-by time flow rate (FIG. 4: Step 101). The stand-by time flow rate is a flow rate set to be lower than the carrier gas supply flow rate (analysis flow rate) during the sample analysis. The stand-by time flow rate may be a specified value held by the controller 26, may be a value that can be arbitrarily set by the user, or may be configured to be automatically set by the controller 26 based on the analysis flow rate when the analysis flow rate is set.

When the predetermined condition is satisfied, the controller 26 itself or a control device provided separately from the controller 26 detects that the timing at which an analysis is to be started has reached. When the timing at which an analysis is to be initiated (FIG. 4: Step 102) has reached, the controller 26 controls the flow rate adjustment unit 20 such that the flow rate of the carrier gas supplied from the carrier gas supply source 18 is maintained at a preset analysis flow rate, until the analysis is completed (FIG. 4: Steps 103 and 104). When the analysis is completed, the controller 26 controls the flow rate of the carrier gas supplied from the carrier gas supply source 18 to a stand-by time flow rate until the timing at which the subsequent analysis is to be initiated has reached (Steps 104 and 101). Whether the analysis has been completed can be determined based on whether a preset analysis time has elapsed, and can also be determined based on the chromatogram acquired by the analysis. The decision whether the analysis has been completed can be performed by the controller 26 itself or a control device in a case where the control device is provided separately from the controller 26.

Figure 6:
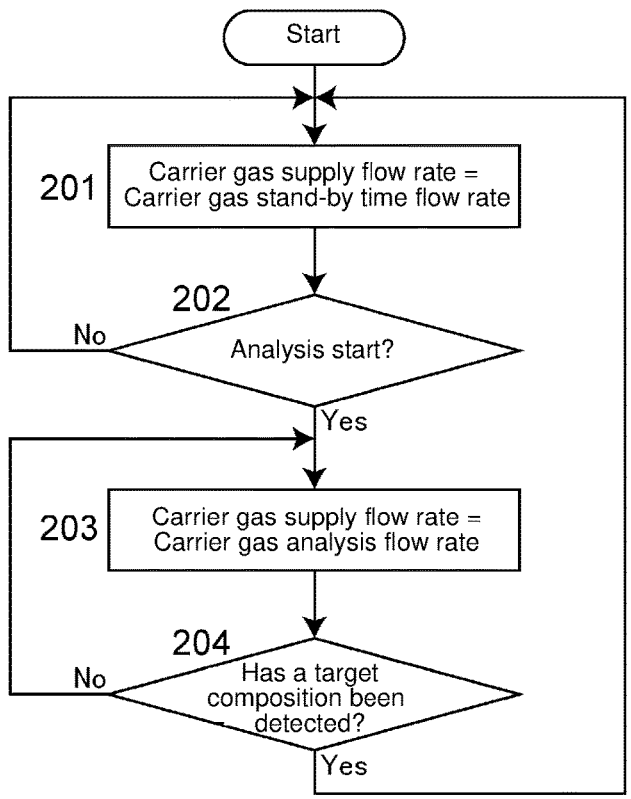
FIG. 6 is a flow chart showing a second example of a control operation of a carrier gas supply flow rate.
Figure 7:
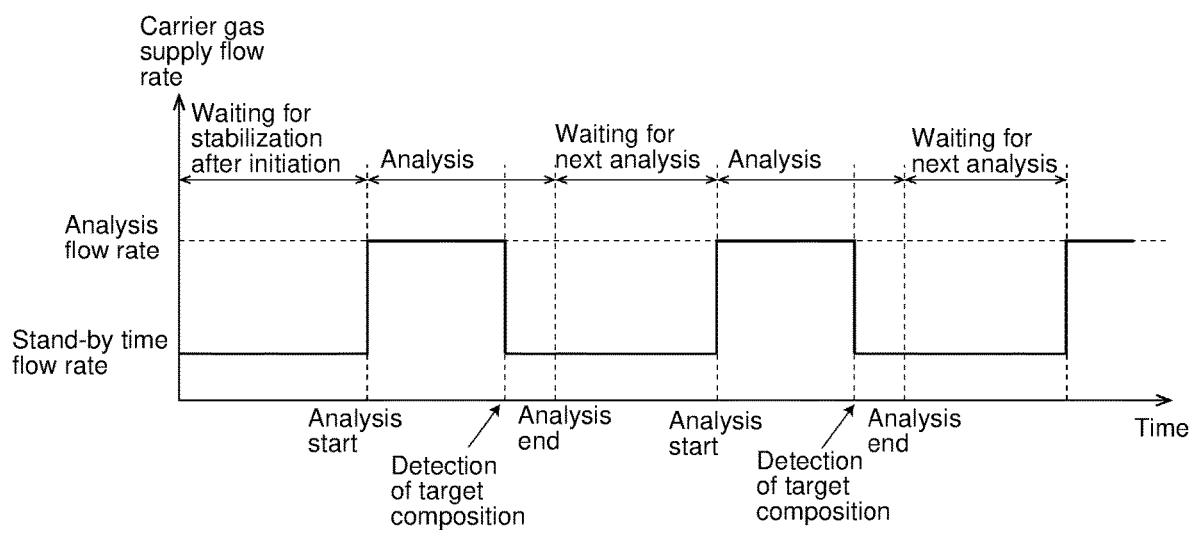
FIG. 7 is a time chart of a carrier gas supply flow rate implemented by a second example of a control operation.

By controlling as described above, the usage of the carrier gas can be saved because the consumption of the carrier gas during the stand-by time in which no analysis is performed is lower than that during the analysis. In a case where an analysis is performed by focusing only on a particular peak component among peak components appearing in a chromatogram, as shown in FIG. 6 and FIG. 7, the supply flow rate of the carrier gas may be controlled to be a stand-by time flow rate after the detection of a target component without waiting for the completion of the analysis (FIG. 6: Steps 204 and 201). The determination of whether a target component has been detected can be performed by the controller 26 itself or a control device provided separately from the controller 26, based on the detection signal from the detection circuit 24.

Note that the example described above is only an exemplary embodiment of the thermal conductivity detector according to the present invention. Embodiments of the thermal conductivity detector according to the present invention are as follows.

In one embodiment of the thermal conductivity detector according to the present invention, a thermal conductivity detector includes:

a first flow path in which a filament is arranged;

a second flow path provided separately from the first flow path;

an introduction flow path configured to fluidly communicate between an upstream end of the first flow path and an upstream end of the second flow path;

a sample inlet configured to introduce a sample gas to the introduction flow path;

a first gas inlet provided between the sample inlet in the introduction flow path and the upstream end of the first flow path;

a second gas inlet provided between the sample inlet in the introduction flow path and the upstream end of the second flow path;

a carrier gas supply source;

a selector configured to selectively introduce the carrier gas from the carrier gas supply source to one of the first gas inlet and the second gas inlet; and a detection circuit configured to detect a component in the sample gas using the filament, wherein when the carrier gas from the carrier gas supply source is guided to the first gas inlet, a reference phase in which only the carrier gas flows through the first flow path is formed, and when the carrier gas from the carrier gas supply source is guided to the second gas inlet, a sampling phase in which the sample gas flows through the first flow path is formed, and wherein fluid resistance of the first flow path and fluid resistance of the second flow path are designed such that a ratio of a difference between a reference flow rate and a sampling flow rate to each of the reference flow rate and the sampling flow rate becomes 15% or less, the reference flow rate being a flow rate of a gas flowing through the first flow path in the reference phase, the sampling flow rate being a flow rate of gases flowing through the first flow path in the sampling phase.

According to one aspect of the above-described embodiment 1, a ratio of the fluid resistance of the first flow path to the fluid resistance of the second flow path is 3 times or less.

According to a second aspect of the above-described embodiment, the thermal conductivity detector further includes:

a flow rate adjustment unit configured to adjust a supply flow rate of the carrier gas supplied from the carrier gas supply source; and a controller configured to control an operation of the flow rate adjustment unit, wherein the controller is configured to control the supply flow rate of the carrier gas to a preset analysis flow rate during a period from when the analysis is initiated until when the analysis is completed, and the supply flow rate of the carrier gas to a stand-by time flow rate set to be lower than the analysis flow rate during a stand-by time from when the analysis is completed until when a subsequent analysis is initiated.

According to this aspect, the consumption of the carrier gas can be reduced. This second aspect can be combined with the first aspect described above.

According to a third aspect of the above-described embodiment, the thermal conductivity detector further includes:

a flow rate adjustment unit configured to adjust a supply flow rate of the carrier gas supplied from the carrier gas supply source; and a controller configured to control an operation of the flow rate adjustment unit, wherein the controller is configured to control the supply flow rate of the carrier gas to a preset analysis flow rate during a period from when an analysis is initiated until when a target component is detected, and the supply flow rate of the carrier gas to a stand-by time flow rate set to be lower than the analysis flow rate during a stand-by time from when the target component is detected until when a subsequent analysis is initiated.

According to this aspect, the consumption of the carrier gas can be reduced. This third aspect can be combined with the first aspect described above.

In the above-described third aspect, the controller is configured to detect whether the target component is detected, based on a detection signal acquired by the detection circuit.

DESCRIPTION OF SYMBOLS

1: Thermal conductivity detector
2: Filament
4: First flow path
6: Second flow path
8: Introduction flow path
10: Sample inlet
12: First gas inlet
14: Second gas inlet
16: Gas outlet
18: Carrier gas supply source
20: Flow rate adjustment unit
22: Selector
24: Detection circuit
26: Controller

The invention claimed is:

1. A thermal conductivity detector comprising:
a first flow path in which a filament is arranged;
a second flow path provided separately from the first flow path;
an introduction flow path configured to fluidly communicate between an upstream end of the first flow path and an upstream end of the second flow path;
a sample inlet configured to introduce a sample gas to the introduction flow path;
a first gas inlet provided between the sample inlet in the introduction flow path and the upstream end of the first flow path;
a second gas inlet provided between the sample inlet in the introduction flow path and the upstream end of the second flow path;
a carrier gas supply source;
a selector configured to selectively introduce the carrier gas from the carrier gas supply source to one of the first gas inlet and the second gas inlet; and
a detection circuit configured to detect a component in the sample gas using the filament,
wherein when the carrier gas from the carrier gas supply source is guided to the first gas inlet, a reference phase in which only the carrier gas flows through the first flow path is formed, and when the carrier gas from the carrier gas supply source is guided to the second gas inlet, a sampling phase in which the sample gas flows through the first flow path is formed, and
wherein fluid resistance of the first flow path and fluid resistance of the second flow path are designed such that a ratio of a difference between a reference flow rate and a sampling flow rate to each of the reference flow rate and the sampling flow rate becomes 15% or less, the reference flow rate being a flow rate of a gas flowing through the first flow path in the reference phase, the sampling flow rate being a flow rate of gases flowing through the first flow path in the sampling phase.

2. The thermal conductivity detector as recited in claim 1, wherein a ratio of the fluid resistance of the first flow path to the fluid resistance of the second flow path is 3 times or less.

3. The thermal conductivity detector as recited in claim 1, further comprising:
a flow rate adjustment unit configured to adjust a supply flow rate of the carrier gas supplied from the carrier gas supply source; and
a controller configured to control an operation of the flow rate adjustment unit,
wherein the controller is configured to control
the supply flow rate of the carrier gas to a preset analysis flow rate during a period from when the analysis is initiated until when the analysis is completed, and
the supply flow rate of the carrier gas to a stand-by time flow rate set to be lower than the analysis flow rate during a stand-by time from when the analysis is completed until when a subsequent analysis is initiated.

4. The thermal conductivity detector as recited in claim 1, further comprising:
a flow rate adjustment unit configured to adjust a supply flow rate of the carrier gas supplied from the carrier gas supply source; and
a controller configured to control an operation of the flow rate adjustment unit,
wherein the controller is configured to control
the supply flow rate of the carrier gas to a preset analysis flow rate during a period from when an analysis is initiated until when a target component is detected, and
the supply flow rate of the carrier gas to a stand-by time flow rate set to be lower than the analysis flow rate during a stand-by time from when the target component is detected until when a subsequent analysis is initiated.

5. The thermal conductivity detector as recited in claim 4, wherein the controller is configured to detect whether the target component is detected, based on a detection signal acquired by the detection circuit.

* * * * *